United States Patent
Andoh

(10) Patent No.: US 6,639,773 B2
(45) Date of Patent: Oct. 28, 2003

(54) CURRENT LIMITER

(75) Inventor: Hajime Andoh, Shiga (JP)

(73) Assignee: Texas Instruments Incorporated, Dallas, TX (US)

( * ) Notice: Subject to any disclaimer, the term of this patent is extended or adjusted under 35 U.S.C. 154(b) by 36 days.

(21) Appl. No.: 09/991,726

(22) Filed: Nov. 21, 2001

(65) Prior Publication Data

US 2002/0064009 A1 May 30, 2002

Related U.S. Application Data

(60) Provisional application No. 60/253,376, filed on Nov. 28, 2000.

(51) Int. Cl.[7] .............................. H02H 9/00; G01R 19/00
(52) U.S. Cl. ............................................. 361/58; 327/58
(58) Field of Search ............................... 361/58; 327/58, 327/59, 60, 61

(56) References Cited

U.S. PATENT DOCUMENTS

| | | | |
|---|---|---|---|
| 5,559,660 A | | 9/1996 | Watson et al. |
| 5,955,915 A | * | 9/1999 | Edwards ..................... 327/541 |
| 6,064,238 A | | 5/2000 | Wight et al. |
| 6,069,499 A | | 5/2000 | Cho et al. |

* cited by examiner

Primary Examiner—Gregory J. Toatley, Jr.
Assistant Examiner—Boris Benenson
(74) Attorney, Agent, or Firm—W. Daniel Swayze, Jr.; W. James Brady; Frederick J. Telecky, Jr.

(57) ABSTRACT

A current limiting circuit to limit current including an input circuit to input an input voltage, a connecting circuit to connect the input voltage to a current, and a current limiting circuit controlled by a constant voltage to limit said current.

4 Claims, 1 Drawing Sheet

CURRENT LIMITER

This application claims priority under 35 USC §119(e)(1) of provisional application Serial No. 60/253,376, filed Nov. 28, 2000.

FIELD OF THE INVENTION

The present invention relates to current limiting circuits and more particularly to current limiting circuits for DVD disk drives.

BACKGROUND OF THE INVENTION

In a disk, such as DVD or DVD-RAM, information is recorded in sector units. Each sector includes header information having a physical identification data (PID) area and a user data area. The header information may be recorded on the first sector of the track. Typically, the header information area is divided into peak header area and a bottom header area, and the user data area being divided into a land area and a groove area.

In DVD-RAM disks, a track is formed spirally, and the track is shifted laterally at a predetermined reference point. The reference point usually becomes a starting point of the first sector.

Additionally, as it is known in the art, there exists a need in computer and other types of systems to provide fault-tolerant and redundant circuits. In such systems, when the circuit board or circuit component fails and thus requires replacement, it is often desirable to replace the circuit board or circuit component without removing the operating power from the system. Thus, in these cases, it is necessary to remove the faulty board or circuit component from the system while the system is still operating, and in a simpler matter, it is necessary to install a repaired or new circuit board or circuit component into the system which already has power being provided thereto. That is, the replacement circuit board or circuit component is inserted into a so-called "live" or "hot" system. Similarly, in DVD systems, the same problem occurs during the removal of the medium, from fingerprints and scratches, etc. on the DVD disk. This results in a large noise being introduced in the peak detector in the form of current or voltage. These large current or voltage spikes which results from the removal or the installation of a circuit board or circuit component or from the peak detector detecting signals on the DVD disk from the fingerprints and scratches, causing the system voltage to drop to unacceptable levels. The drop in supply voltage is due to the inability of the power supply to source the necessary current. As electrical charge collects, due to the capacitive effects, the current will decrease until a steady state current is reached in the power supply returns to the nominal level. However, such an operation requires a large amount of time to return back to these nominal levels.

FIG. 1 illustrates one such circuit where the input voltage is input to the gate of a transistor 100. If this input voltage rises rapidly, a large current will flow from the collector to the base of the transistor 100. This additional current will flow through resistor 102 and charge up capacitor 106 increasing the peak hold voltage which is output from the circuit.

FIG. 2 illustrates the increasing voltage and corresponding change in current as illustrated by curve 202. It is required to have a circuit that will respond when subjected to large currents to return quickly to nominal values.

SUMMARY OF THE INVENTION

The present invention provides a circuit that will provide a constant current with a large noise current. The current is limited by the operation of a FET.

DETAILED DESCRIPTION OF THE PRESENT INVENTION

Figure 3:
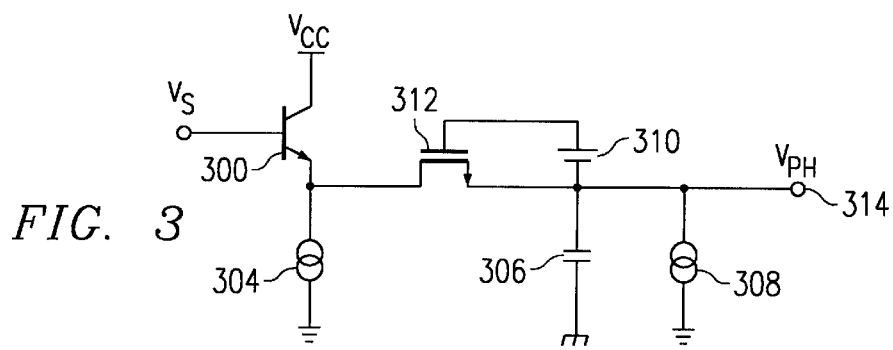
FIG. 3 illustrates a current limiting circuit of the present invention.

Turning now to FIG. 3, FIG. 3 illustrates a transistor 300 connected to receive input signal, namely a voltage $V_S$ at the base of transistor. The collector of transistor 300 is connected to voltage $V_{CC}$ while the emitter of transistor 300 is connected to a constant current source 304. Connected to the emitter of transistor 300 is NFET 312. The drain of NFET 312 is connected to the emitter of transistor 300. The source of NFET 312 is connected to the output terminal 314. Additionally connected to the output terminal 314 is constant voltage source 310. The other end of constant voltage source 310 is connected to the gate of NFET 312. The constant voltage source 310 provides a constant voltage to the gate of NFET 312. NFET 312 operates at single point as a result of the constant voltage from constant voltage source 310 to allow a constant current to flow from source to drain of NFET 312. Additionally, capacitor 306 is connected to node 314 as well as constant current source 308 is connected to node 314. In operation, if voltage $V_S$ should increase, transistor 300 would be able to conduct more current from collector to emitter of transistor 300. Transistor 300 connects the input voltage $V_S$ to a current. However, this current would attempt to flow through the drain to source of NFET 312, but because the gate of NFET 312 is at a constant voltage, the biasing of NFET 312 will prevent additional current from flowing. Thus, the voltage output from terminal 314 remains constant.

Figure 4:
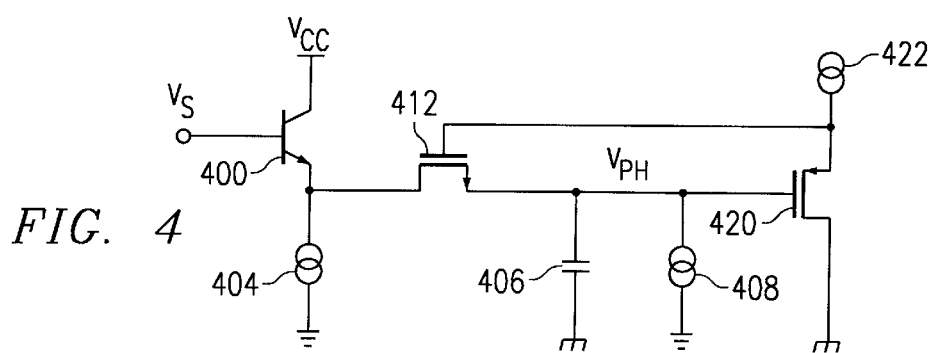
FIG. 4 illustrates a current limiting circuit of the present invention.

Turning now to FIG. 4, FIG. 4 illustrates a similar circuit. Transistor 400 is connected to receive the input voltage $V_S$ at the base of transistor 400. The collector of transistor 400 is connected to $V_{CC}$ while the emitter of transistor 400 is connected to constant current source 404. The other end of constant current source 404 is connected to ground. Additionally, the NFET 412 is connected such that a drain of NFET 412 is connected to the emitter of transistor 400 while the source of NFET 412 is connected to the capacitor 406 with the other end of capacitor 406 connected to ground. Additionally, the source of NFET 412 is connected to constant current source 408. The gate of PFET 420 is connected to the source of NFET 412. The source of PFET 420 is connected to constant current source 422 and to the gate of NEET 412. The above circuit arrangement keeps the gate of NFET 412 at a constant voltage and consequently similar to the circuit of FIG. 3, the NFET 412 prevents additional current from flowing from gate to source.

Figure 1:
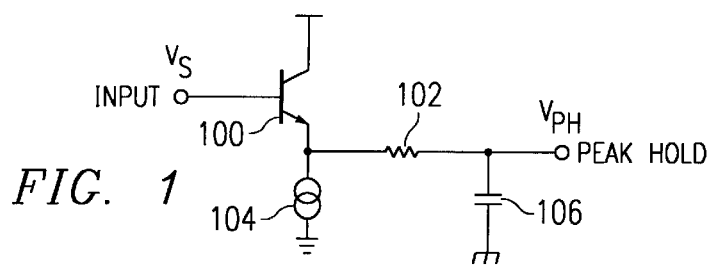
FIG. 1 illustrates a current limiting circuit.
Figure 2:
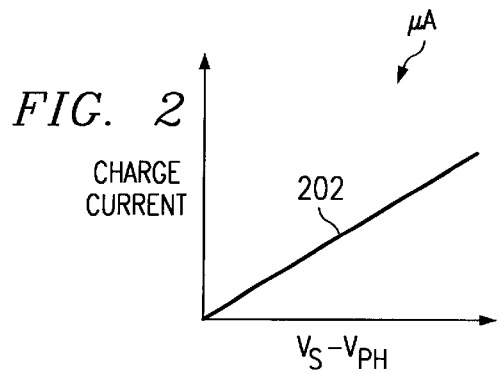
FIG. 2 illustrates a graph of the current voltage characteristics of the current limiting circuit.
Figure 5:
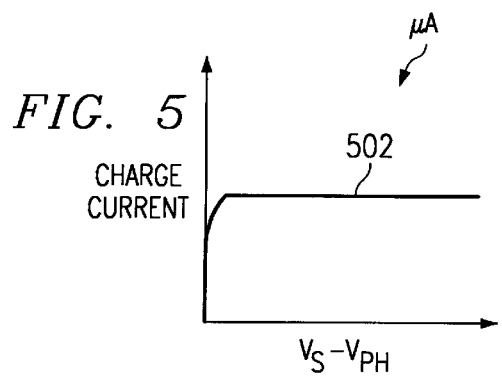
FIG. 5 illustrates the voltage/current characteristics of the circuit of the present invention.

Turning now to FIG. 5, for changes in voltage, it can be very clearly seen that the current remains constant. More particularly, current is essentially flat. A change in voltage $V_S$ results in little current change.

The present invention including the circuits of FIGS. 3 and 4 may be used in a DVD.

What is claimed is:

1. A current limiting circuit to limit current, comprising:

a input circuit to input an input voltage;

a connecting circuit to connect the input voltage to a current source; and a current limiting circuit controlled by a constant voltage to limit said current, wherein said constant voltage circuit includes a PFET.

2. A current limiting circuit to limit current as in claim 1, wherein said connecting circuit includes a transistor.

3. A current limiting circuit to limit current as in claim 2, wherein said current limiting circuit includes a FET.

4. A current limiting circuit to limit current as in claim 1, wherein said constant voltage is generated by a constant voltage circuit.

* * * * *